United States Patent
Hussmann et al.

(10) Patent No.: US 12,464,966 B2
(45) Date of Patent: Nov. 11, 2025

(54) CARRIER SYSTEM COMPRISING A CARRIER AND A MOBILE DEVICE FOR TILLING THE SOIL AND/OR FOR MANIPULATING FLORA AND FAUNA, AND METHOD THEREFOR

(71) Applicant: NAITURE GMBH & CO. KG, Friedrichsgabekoog (DE)

(72) Inventors: Stephan Hussmann, Heide (DE); Florian Johannes Knoll, Husum (DE); Vitali Czymmek, Heide (DE)

(73) Assignee: WESTHOF PATENTE GmbH, Friedrichsgabekoog (DE)

( * ) Notice: Subject to any disclaimer, the term of this patent is extended or adjusted under 35 U.S.C. 154(b) by 805 days.

(21) Appl. No.: 17/268,529

(22) PCT Filed: Aug. 22, 2019

(86) PCT No.: PCT/EP2019/072521
§ 371 (c)(1),
(2) Date: Feb. 15, 2021

(87) PCT Pub. No.: WO2020/039045
PCT Pub. Date: Feb. 27, 2020

(65) Prior Publication Data
US 2022/0117146 A1  Apr. 21, 2022

(30) Foreign Application Priority Data

Aug. 24, 2018 (DE) .................... 10 2018 120 755.7
Aug. 24, 2018 (DE) .................... 10 2018 120 756.5

(51) Int. Cl.
*A01B 79/00* (2006.01)
*A01B 39/08* (2006.01)
(Continued)

(52) U.S. Cl.
CPC .......... *A01B 79/005* (2013.01); *A01B 39/085* (2013.01); *A01M 21/02* (2013.01);
(Continued)

(58) Field of Classification Search
CPC .... A01B 79/005; A01B 39/085; A01M 21/02; G05B 13/027; G05D 1/0219;
(Continued)

(56) References Cited

U.S. PATENT DOCUMENTS 7,151,848 B1 * 12/2006 Watanabe .............. B25J 9/1697
382/141
9,927,807 B1  3/2018 Kanjoo
(Continued)

FOREIGN PATENT DOCUMENTS

CN  206775150 U  12/2017
WO  2014111387 A1  7/2014
(Continued)

OTHER PUBLICATIONS

Knoll et al, CPU Architecture for a Fast and Energy-Saving Calculation of Convolution Neural Networks, Digital Optical Technologies, Proc. Olf SPIE vol. 10335, 1-3351M, 2017,pp. 1-9, Heide, Germany.
(Continued)

*Primary Examiner* — Anne Marie Antonucci
*Assistant Examiner* — Connor L Knight
(74) *Attorney, Agent, or Firm* — WOODLING, KROST AND RUST

(57) ABSTRACT

The invention relates to a carrier system (10) comprising a carrier (12) and a mobile device (14) for tilling the soil and/or for manipulating flora and fauna, the carrier (12) having: a drive (16) for moving the carrier system (10); a control system (12*b*); an energy source (24), which cooperates with the drive (16) and provides the voltage
(Continued)

required for operation; a receptacle (12a) for receiving and connecting to the mobile device (14); a communication unit (30); a first communication interface (36a) that co-operates with the communication unit (30) in order to exchange data with the mobile device (14) which has a dedicated interface (36b); and a second communication interface (32) that co-operates with the communication unit (30) and that at least receives control data and forwards said data to the control system (12b) for the pre-defined movement of the carrier system (10).

31 Claims, 10 Drawing Sheets

(51) Int. Cl.
| | | |
|---|---|---|
| *A01M 21/02* | (2006.01) | |
| *G05B 13/02* | (2006.01) | |
| *G05D 1/00* | (2006.01) | |
| *G05D 1/02* | (2020.01) | |
| *G06T 7/10* | (2017.01) | |
| *G06T 7/70* | (2017.01) | |
| *G06T 7/90* | (2017.01) | |
| *G06V 10/75* | (2022.01) | |
| *G06V 10/764* | (2022.01) | |
| *G06V 10/82* | (2022.01) | |
| *G06V 20/10* | (2022.01) | |
| *H04N 5/225* | (2006.01) | |
| *H04N 5/232* | (2006.01) | |
| *H04N 9/64* | (2023.01) | |
| *H04N 23/54* | (2023.01) | |
| *H04N 23/60* | (2023.01) | |

(52) U.S. Cl.
CPC ......... *G05B 13/027* (2013.01); *G05D 1/0219* (2013.01); *G05D 1/0231* (2013.01); *G06T 7/10* (2017.01); *G06T 7/70* (2017.01); *G06T 7/90* (2017.01); *G06V 10/75* (2022.01); *G06V 10/764* (2022.01); *G06V 10/82* (2022.01); *G06V 20/188* (2022.01); *H04N 23/54* (2023.01); *H04N 23/64* (2023.01); *G06T 2207/10024* (2013.01); *G06T 2207/20084* (2013.01)

(58) Field of Classification Search
CPC ...... G05D 1/0231; G05D 1/0094; G06T 7/10; G06T 7/70; G06T 7/90; G06T 2207/10024; G06T 2207/20084; G06V 10/75; G06V 10/764; G06V 10/82; G06V 20/188; G06V 20/17; H04N 9/64; H04N 23/54; H04N 23/64; H04N 23/80; H04W 4/02; H04W 4/40; H04W 4/38; B64U 70/00; B64U 70/20; B64U 50/34; B64U 10/60

See application file for complete search history.

(56) References Cited

U.S. PATENT DOCUMENTS

| | | |
|---|---|---|
| 10,095,235 B2 | 10/2018 | Sugumaran et al. |
| 10,149,468 B2* | 12/2018 | Crinklaw ............. G05D 1/0246 |
| 10,500,735 B1* | 12/2019 | Menon ................. B25J 15/0061 |
| 10,543,984 B1* | 1/2020 | Alduaiji ................ B64U 20/40 |
| 10,548,306 B2 | 2/2020 | Albert et al. |
| 2008/0137159 A1 | 6/2008 | Lim |
| 2016/0119606 A1* | 4/2016 | Horikawa ............ H04N 13/111 348/46 |
| 2016/0196756 A1* | 7/2016 | Prakash ................. B64U 70/95 701/3 |
| 2016/0205872 A1* | 7/2016 | Chan ....................... A01G 3/088 |
| 2017/0031365 A1* | 2/2017 | Sugumaran .......... G05D 1/0219 |
| 2017/0032544 A1 | 2/2017 | Dempsey |
| 2018/0158197 A1 | 6/2018 | Desgupta |
| 2018/0160673 A1 | 6/2018 | Albert et al. |
| 2019/0108435 A1* | 4/2019 | Mehnert .............. G06V 20/584 |
| 2019/0227575 A1 | 7/2019 | Maor |
| 2020/0120886 A1* | 4/2020 | Geltner ................ G06V 20/188 |
| 2021/0158041 A1* | 5/2021 | Chowdhary ......... G05D 1/0272 |
| 2021/0176978 A1 | 6/2021 | Hussmann et al. |

FOREIGN PATENT DOCUMENTS

| | | |
|---|---|---|
| WO | 2017181127 A1 | 10/2017 |
| WO | 2018033925 A1 | 2/2018 |

OTHER PUBLICATIONS

DJI, MG Series Spreading System, User Guide, 2020, pp. 1-17, http://www.dji.com/support.
Agras MG-1S RTK User Manual V. 1.0, Download From http://www.dji.com/product/mg-1s, 2017.
PCT International Search Report for PCT/EP2019/072521 and English Translation.
Written Opinion for PCT/EP2019/072521.
The International Bureau of WIPO, International Preliminary Report on Patentability, Translation, Mar. 2, 2021, pp. 1-14.
Israel Office Action Daged Dec. 31, 2023, Serial No. 278555.2, 4 Pages.
MG spreading system user guide v1.0 Dated Mar. 30, 2018; https://dl.djicdn.com/downloads/mg_1s/20180330/MG_Spreading_System_User_Guide. v1.0_Multi.pdf Date Accessed Jun. 13, 2024.
AGRAS MS-1S User Manual Dated Oct. 17, 2017; https://dl.djicdn.com/downloads/mg_1s/20171017/MG-1S_MG-1S_RTK_User_Manual_v1.0_EN.pdf; Date Accessed Jun. 13, 2024.
China Patent Application No. 201980055947.3, Office Action Dated Apr. 25, 2024, Applicant: Naiture GMBH & Co. KG, 22 Pages Including English Translation Attached.
Korean Patent Application No. 10-2021-7008621, Office Action Dated Apr. 29, 2024, Applicant Naiture GMBH & Co. KG, 16 Pages Including English Translation Attached.
Ukrainian Patent Application No. a 2021 01552, Office Action Dated Jun. 26, 2024, Applicant: Naiture GMBH & Co. KG, 6 Pages, English Translation.
Ukrainian Patent Application No. a 2021 01552, Office Action Dated Jun. 26, 2024, Applicant Naiture GMBH & Co. KG, 9 Pages.
Article entitled CPU architecture for a fast and energy-saving calculation of Convolution Neural Networks Florian J. Knoll*; Michael Greicke, Vitali Czymmek, Tim Holtorf and Stephan Hussmann Faculty of Engineering, West Coast University of Applied Sciences, Fritz-Thiedemann-Ring 20, 25746 Heide, Germany; Proc. of SPIE vol. 10334 (Jun. 2017).

* cited by examiner

CARRIER SYSTEM COMPRISING A CARRIER AND A MOBILE DEVICE FOR TILLING THE SOIL AND/OR FOR MANIPULATING FLORA AND FAUNA, AND METHOD THEREFOR

PCT/EP2019/072521, international application filing date Aug. 22, 2019, German patent application no. 10 2018 120 755.7, filed Aug. 24, 2018, and German patent application no. 10 2018 120 756.5, filed Aug. 24, 2018 are incorporated herein by reference hereto in their entireties.

FIELD OF THE INVENTION

The invention relates to a carrier system comprising a carrier and a mobile device for tilling the soil and/or for manipulating flora and fauna, to a method for real-time control of the tilling of the soil and/or of manipulating flora and fauna, and to a mobile analysis and processing device.

BACKGROUND OF THE INVENTION

Weed control in agriculture is a very labor-intensive task, especially in organic farming which prohibits or restricts the use of chemicals. Depending on the crop cultivated, weed control may be necessary in close proximity to the crop. Weed control measures are usually taken in the early growth stage of the crop because at this stage, both crops on the one hand and weeds on the other hand are still very small and close to each other. In order to avoid damage to the crop, it is expedient to use selective methods. Organic farming, for example for carrots, for this purpose adopts a labor-intensive, physically stressful manual approach using so-called lay down or prone weeders comprising platforms on which seasonal workers lie on their stomachs and remove the weeds manually.

For special crops with larger plant spacing, such as sugar beets or lettuce, tractor mounted implements are known which are able to recognize individual crops and control appropriate tools in such a way that they will leave the area of the crop untilled. No selectivity is required for this task, meaning that these systems do not check the areas to be tilled, but rather control the tool "blindly" based on the known crop position. In this case, the accuracy requirements are generally defined by the distance to the crop.

A device for weed control is disclosed in DE 40 39 797 A1, in which an actuator for destroying the weeds is permanently in operation, which operation will only be briefly interrupted when a sensor detects a crop. In this case, the carrier is in the form of a trolley.

Disclosed in DE 10 2015 209 879 A1 is a device for damaging weeds which has a processing tool. This processing tool is used to damage the weeds. In addition, a classification unit is provided which either has the position data of the weeds or detects the weeds and determines the position data. A localization unit determines a relative position between the processing tool and the weeds. A manipulator unit in the form of a trolley positions the processing tool accordingly based on the determined relative positions.

A corresponding device with a pressure conveying unit and a liquid dispensing unit is disclosed in DE 10 2015 209 891 A1. In this embodiment, weeds are destroyed by spraying them with pressurized liquid. The carrier in this case is in the form of a trolley.

DE 10 2015 209 888 A1 discloses the pulsed application of liquid to weeds in order to damage them. Here, too, the carrier is in the form of a trolley.

DE 10 2013 222 776 A1 discloses a ram mounted in a trolley, which ram is arranged in a guide device for guiding the ram. In this case, the ram is positioned on the weed and subjected to pressure. The weed is destroyed by the impingement of the ram under pressure.

Agricultural robots and harvesters, which are automated and equipped with telematics technology to support agriculture, are currently breaking new ground. In many cases, engineering principles and findings from space travel, remote sensing and robotics can be used to solve problems in agriculture. However, they have to be specifically adapted to the tasks in agriculture and require new devices and procedures.

For example, the existing automated agricultural robots mentioned above are systematically designed to drive down only one row of plants at a time. They will only tackle the flora, and only serially. Checks are usually made afterwards by inspection, for example by a qualified human being.

A disadvantage of the known devices is also that all the carriers are specially designed trolleys which only drive down one row of crops at a time and are relatively inflexible to use.

Furthermore, aerial drones are known as carrier systems, which drones are specially designed for use in agriculture. These, too, are special constructions which have limited flexibility for different requirement profiles in agriculture.

Another problem in the automated tilling of the fields is the collection of data as to where weeds are located and what is to be treated as a crop in contrast.

DE 10 2005 050 302 A1 discloses a method for the contactless determination of the current nutritional status of a plant stock and for the processing of this information into a fertilization recommendation, taking into account further parameters such as crop type and/or variety and/or development stage and/or yield target. In this method, at least one digital image of a part of the plant stock is recorded in at least two spectral channels by means of an image recording system. The current nutritional status is then determined from the image by image analysis, and the fertilization recommendation is derived from the latter. This known prior art has the disadvantage that data processing takes relatively long and thus is not suitable for an in situ system.

DE 10 2008 009 753 B3 further describes a method for non-contact determination of the biomass and morphological parameters of plant stocks, in which an ultrasonic field emitted by an ultrasonic source mounted on a mobile carrier acts on the plants of the stock as the carrier passes over them. The sound echoes reflected by the plants and the soil are detected by a receiver mounted on the carrier, which receiver, after converting the sound echoes into digital signals, transmits them to an evaluation and signal processing unit which immediately evaluates the signals, stores them on a data carrier and displays them on a monitor, with the additional option of processing the signals into control commands in an electronically controlled discharge unit for spreading product preparations. Although this prior art can be used to directly determine morphological parameters such as the number of leaf layers, leaf position and the vertical distribution of the biomass, it does not allow for the identification of weeds.

SUMMARY OF THE INVENTION

According to a first aspect of the invention, it is the object of the invention to provide a carrier system comprising a carrier and a mobile device for tilling the soil and/or for manipulating the flora and fauna, as well as a method for real-time control of the tilling of the soil and/or the manipulation of flora and fauna by the carrier system, which permits real-time controlled, qualified removal of the detected flora and/or fauna, and also parallel analysis of flora and fauna. Preferably, the carrier system is adapted to be connected in a modular way to different mobile devices which include sensors and/or tool units optimally suited for requirements of the respective application.

According to a further aspect, it is the object of the invention to provide a mobile analysis and processing device for agriculture for tilling the soil and/or for manipulating flora and fauna, as well as a method which permits real-time controlled, qualified removal of the detected flora and/or fauna as well as a parallel analysis of flora and fauna. Real time in this context means that the method permits in situ analysis and processing.

According to the first aspect thereof, the invention is based on the insight that a carrier system which provides common functions of a carrier and mobile device in the carrier and which only arranges those units of the carrier system in the mobile device that are actually required by the mobile device, will achieve a significantly higher degree of flexibility for the carrier system, in particular if the mobile device is detachably connected to the carrier and can be exchanged for other mobile devices.

The invention therefore relates to a carrier system comprising a carrier and a mobile device for tilling the soil and/or for manipulating the flora and fauna. The carrier is provided with a drive for moving the carrier system, with a control device, with a power source cooperating with the drive and providing the necessary voltage for operation, with a receptacle for receiving and connecting to the mobile device, with a communication unit, with a first communication interface cooperating with the communication unit for data exchange with the mobile device which has an associated interface, and with a second communication interface cooperating with the communication unit. The second communication interface is used to receive at least control data. The communication unit then passes the control data on to the control device for predetermined movement of the carrier system. This gives the carrier system the degree of flexibility required for a wide range of applications, but also for meeting different needs in agriculture, in that it allows mobile devices to be connected to a uniform carrier as required.

Preferably, the carrier can be an unmanned aircraft (aerial drone), an unmanned land vehicle, an unmanned watercraft, or an unmanned underwater vehicle, for example for aquaculture. Depending on the field of application, one or the other carrier is used.

According to one embodiment of the invention, the second communication interface is an antenna, which is designed to exchange data with a central, preferably stationary, computer that is separate from the carrier. This enables processing and evaluation of devices, for example for telemetry and/or for evaluation of the determined data, independently of the carrier. The carrier can thus be made of a more lightweight design.

However, to also permit data exchange with the mobile device, the second communication interface is designed for this purpose.

The carrier requires a voltage source for operating the drive, for example. In order to provide such a voltage source only once, and thus save weight in the carrier system, the carrier and the mobile device each have a voltage connection which can also be used to supply voltage to the mobile device. Thus, a single power source is provided for both the carrier and the mobile device.

In order to ensure that the carrier can be interchangeably used with different mobile devices, the carrier and the mobile device have means for connection to one another as required.

For example, the carrier may have a gripper and the mobile device may have receptacles provided for the gripper, which gripper is used to grip the mobile device and detachably connect it to the carrier. Alternatively or additionally, the carrier and the mobile device can have coupling means associated with one another, via which the mobile device can be detachably connected to the carrier.

According to one embodiment of the invention, the carrier has a GPS unit for continuously detecting the position coordinates of the carrier. This allows the position coordinates to be assigned to the data determined via the sensor and thus facilitates evaluation.

Preferably, the mobile device is provided with at least one sensor, a tool unit with at least one motor-driven tool, an actuator for moving at least the tool of the tool unit, a motor for driving the tool unit and/or the actuator, a database, a first communication unit with an interface and a first computer. The computer is used to control the motor, the sensor, the tool unit and/or the actuator based on generated control commands. The data acquired via the sensor are continuously compared with the data stored in the database in order to generate corresponding control signals for the motor, the sensor, the tool unit and/or the actuator. This device creates a degree of mobility and flexibility that allows the mobile device to form a separate entity that permits real-time processing of all data, generates control signals for the tool unit and thus enables immediate operation of the tool unit based on the control signals. This opens up possibilities for combination, for example with different carriers for moving the device across the field as needed.

Preferably, synchronization of the data determined by the sensor with the database is performed in real time, in particular with a verification and classification of the data determined by the sensor. This increases the responsiveness of the device. Real-time is understood to mean the possibility of being able to perform analysis and processing operations in situ in a single operation.

According to one embodiment of the invention, the sensor is a visual detection unit with a camera. The data to be processed is thus image data which can be easily compared with data in a database.

To facilitate the exchange of individual components and thus reduce set-up times, the device is designed in two parts. A first unit thereof contains the sensor, the tool unit, the motor for driving the tool unit and/or the actuator, the actuator, the first computer and the first communication unit including an interface. The second unit thereof contains the database, a second computer and a second communication unit including an interface. For data exchange, the first and second units can be connected to each other via the interface. In addition, the two-part design also makes it possible for the two units to be arranged spatially separately from one another. This is advantageous, for example, if the weight of the moving parts of the device is to be kept as low as possible. In this case, the second unit could be arranged in a fixed central position, with the first unit being moved around the field.

In this case, it is convenient for the first unit to comprise a first housing and for the second unit to comprise a second housing which will protect the components contained in the units from external influences.

The first and second housings can be detachably connected to each other via a plug-type connection. This permits the two units to be joined together in a modular fashion, and also facilitates replacement in the case of failure of one unit.

The tool unit preferably has at least one feed unit and one rotation unit which latter cooperates with the motor. This is an easy way of expanding the operating range of the tool without having to actually move the device.

Preferably, at a distal end thereof, the rotation unit is provided with at least the one tool, in particular with a tiller or with a blade unit. Rotation of the blade unit, for example, can be used to selectively destroy small insects or weeds, for example.

In order to further reduce the weight of the device, a voltage connection is provided for an external voltage supply. The voltage connection may be provided on the first unit. In the assembled state of the first and second units, the second unit can use this voltage connection to supply both the first and second units with voltage. Preferably, the voltage source of a carrier is used for the voltage supply.

Advantageously, the interface of the mobile device associated with the carrier for data exchange, for example with an external computer, is arranged in the second unit.

According to one embodiment of the invention, a plurality of different mobile devices is provided, with only one mobile device being arranged in the receptacle at a time. Preferably, the mobile devices have different sensors and/or tool units. If necessary, the one or other mobile device is connected to the carrier, in particular depending on the data determined by the sensor and on the resulting evaluation. In this way, the carrier system can be adapted as needed to the requirements in agriculture and to the current situation.

The above-mentioned object is also accomplished by a method for real-time control of the tilling of the soil and/or of manipulating flora and fauna, in particular by the carrier system of the above-mentioned type, which method comprises the following steps:
  determining the necessary measures;
  performing the determined measures.

Between the steps of determining the necessary measures and performing the determined measures, it is possible to additionally perform the following steps:
  selecting a mobile device from the available devices;
  connecting the selected device to a carrier.

Preferably, after the measure has been performed, the mobile device is exchanged for another mobile device, and another measure is carried out. This considerably increases the flexibility of the carrier system and its possibilities.

The mobile device can determine the necessary measures as follows:
  continuous recording over time of data-defined voxels and/or pixels by a sensor of the mobile device;
  transmitting the recorded data to a database;
  storing the recorded data in the database;
  qualitative data comparison of the recorded data with the data stored in the database, preferably also performing a segmentation, a data reduction and/or a verification of the recorded data by a computer;
  evaluating the compared recorded data with existing defined data sets in the database by a classifier connected to the computer;
  processing and conversion of the evaluation by the computer into control and/or control-related data for a motor, an actuator, a tool unit and/or a carrier.

In particular, the implementation of the determined measures is based on the conversion of the evaluation by the computer into control and/or control-related data for the motor, the actuator, the tool unit and/or, if applicable, the carrier, as well as by starting up the motor, the actuator, the tool unit and/or the carrier for tilling the soil and/or for manipulating flora and fauna.

The evaluation is preferably performed in a computer cooperating with the classifier, in particular in the second computer, and the processing and conversion of the evaluation into control data in another computer, in particular in the first computer. For this purpose, the evaluation is transmitted from the one computer to the other computer. Computing power can be increased by enabling the computers to process the data in parallel.

The storage, the qualitative data comparison of the recorded data with data stored in the database and/or the evaluation by the classifier are preferably supported by artificial intelligence. This considerably improves the effectiveness of the carrier system and of the method.

In order to speed up the analysis of the recorded data, the recorded data is transmitted to the segmentation and data reduction device during data comparison, which latter generates intermediate images. The intermediate images have significantly reduced data.

In particular, after the intermediate images have been generated, they are transmitted to the classifier which evaluates the generated intermediate images based on existing defined images and data sets in the database in cooperation with the computer.

According to one embodiment of the invention, the following steps are performed in sequence in the segmentation and data reduction device to generate the intermediate images:
  each transmitted image of a plurality of pixels is converted to the RGB (red, green, and blue) color model;
  each pixel of the transmitted image based on the RGB color model is converted to an HSV (hue, saturation, value) color model;
  each pixel based on the HSV color model is evaluated in terms of color saturation against a threshold value, wherein, if the color saturation value exceeds a threshold value, the pixel is assigned the binary value "1", and, if the color saturation value falls below a threshold value, the pixel is assigned the binary value "0";
  preferably in parallel with the above step, each pixel is evaluated based on the HSV color model with respect to the hue angle based on a predetermined range, wherein, if the hue angle is within the predetermined range, the pixel is assigned the binary value "1", and if the hue angle is outside the range, the pixel is assigned the binary value "0";
  from the binary hue angle and color saturation information, the first intermediate image is formed, which contains considerably less data than the image generated by the camera.

Preferably, pixel fields are generated from the pixels of the intermediate image in the segmentation and data reduction device in order to further accelerate and optimize the analysis.

In order to be able to later convert the results determined by the evaluation from the images into control data for the actuator and/or the carrier, the segmentation and data reduction device provides the pixels with position coordinates.

According to one embodiment of the invention, the classifier performs the classification using an artificial neural network. Preferably, the artificial neural network used in this case is a convolutional neural network (CNN).

According to a further aspect of the invention, the invention is based on the insight that by designing a mobile analysis and processing device having a visual detection unit that permits reduction of the data to be evaluated to the necessary areas, analysis and evaluation time can be considerably reduced and analysis and processing, for example of agricultural areas, can thereby be completed in only one operation.

Therefore, the invention also relates to a mobile analysis and processing device for agriculture for tilling the soil and/or for manipulating flora and fauna. This mobile device is provided with a visual detection unit comprising a camera with which images are captured. Moreover, a segmentation and data reduction device is provided which is used to generate each image captured by the camera from a plurality of pixels in an RGB (red, green, and blue) color model. Subsequently, each pixel based on the RGB color model is converted to an HSV (hue, saturation, value) color model. Each pixel based on the HSV color model is then evaluated with respect to color saturation based on a threshold value, wherein, if the color saturation value exceeds a threshold value, the pixel is assigned the binary value "1", and if the color saturation value falls below a threshold value, the pixel is assigned the binary value "0". In parallel, each pixel is evaluated based on the HSV color model with respect to the hue angle based on a predetermined range. So, if the hue angle is within the predetermined range, the pixel is assigned the binary value "1", and if the hue angle is outside the range, the pixel is assigned the binary value "0". The binary hue angle and color saturation information is then used to create a first intermediate image, which contains considerably less data than the image generated by the camera. Subsequently, pixel fields are generated from the intermediate image. Furthermore, a classifier is provided which, on the basis of the intermediate image generated by the segmentation and data reduction device, performs the classification of several pixel fields consisting of pixels, with only those pixel fields being classified that have at least one pixel which has been assigned the binary value "1". This results in a significant reduction of data and thus acceleration of the on-site analysis. In addition, there are further optimization opportunities, as can be seen from the following.

It has proven to be favorable for the segmentation and data reduction device to form a pixel field from a square number of pixels, in particular 100, 81, 77, 36, 25, 16, 9 or 4 pixels. Preferably, the pixel field is of a square shape in this case.

According to one embodiment of the invention, the mobile device comprises at least one tool unit with at least one motor-driven tool, an actuator for moving at least the tool of the tool unit, a motor for driving the tool unit and/or the actuator, a database, a first communication unit with an interface and a first computer for controlling the motor, the visual detection unit, the tool unit and/or the actuator based on generated control commands. The data acquired by the visual detection unit is continuously compared with the data stored in the database in order to generate corresponding control signals for the motor, the visual detection unit, the tool unit, the actuator and/or an associated carrier. This creates a degree of mobility and flexibility that allows the device to form an entity that can be used to process all data in real time, to generate control signals for the tool unit and to enable the tool unit to operate immediately based on the control signals. This opens up possibilities for combination with, for example, various carriers that move the device around the field as needed.

Real-time in this context means the possibility of being able to perform analysis and processing operations in situ in a single operation.

In order to be able to connect the device to a carrier, if necessary, that will move the device around, appropriate means for connecting to the carrier are provided.

Preferably, the tool unit comprises at least one feed unit and a rotation unit which cooperates with the motor. This expands the range of use of the tool in a simple manner without the need to move the device.

Preferably, the rotation unit is provided, on a distal end thereof, with at least the one tool, in particular with a tiller or with a blade unit. Rotation of, for example, the blade unit, can be used to selectively destroy small insects or weeds.

Additional advantages, features and possible applications of the present invention may be gathered from the description which follows in which reference is made to the embodiments illustrated in the drawings.

Throughout the description, the claims and the drawings, those terms and associated reference signs are used as are listed in the List of Reference Signs below.

DESCRIPTION OF THE INVENTION

Figure 1:
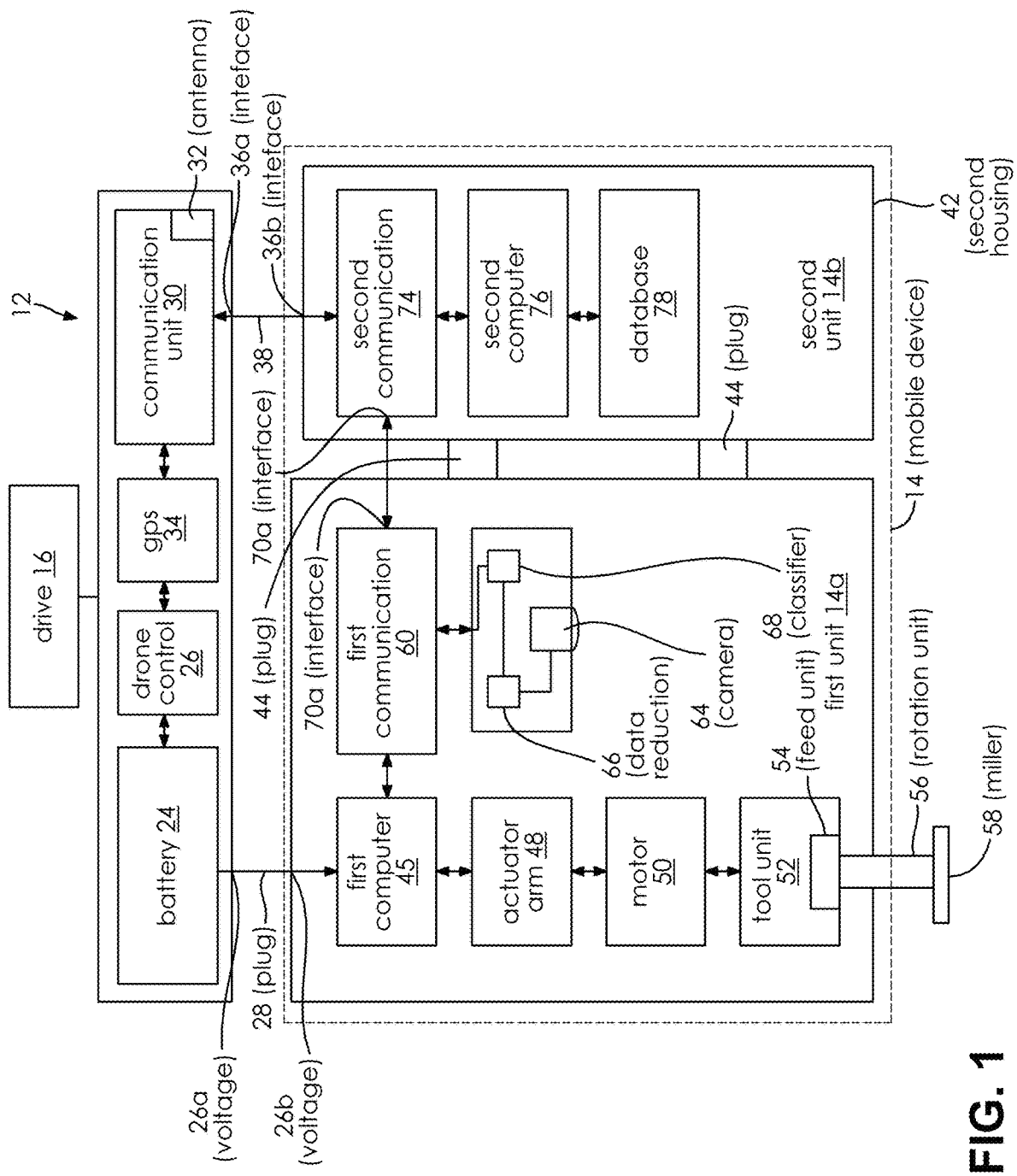
FIG. 1 is a schematic view of a carrier system with spatially separated housings of a mobile device according to a first embodiment of the invention.

FIG. 1 is a schematic view of a carrier system 10 which comprises a carrier in the form of an aerial drone 12 and a mobile device 14 for tilling the ground and for manipulating flora and fauna in agriculture. The aerial drone 12 includes a drive 16 comprising four electric motors 18 and propellers 20 driven by them, see FIG. 3. In addition, the aerial drone 12 has 4 feet 22 disposed below the electric motors 18.

According to the first embodiment of the invention, the aerial drone 12 comprises an energy source in the form of batteries 24, which provides the energy supply for the drive 16 as well as for the further components of the aerial drone 12 and the mobile device 14. For this purpose, a voltage interface 26a is provided on the aerial drone 12 and a voltage interface 26b corresponding to this voltage interface 26a is provided on the mobile device 14, said interfaces being connected to one another via a detachable plug connection 28. In addition, a communication unit 30 with an antenna 32 and a GPS unit 34 is provided which latter continuously determines the location of the aerial drone 12, transmits the location data of the aerial drone 12 to the mobile device 14, for allocation to the data acquired by the mobile device 14, and to a remote central processing unit (not shown here). Telemetry can be performed with the aid of the GPS unit 34, the communication unit 30, and the mobile device 14. In addition, a control unit 12b is provided which controls the drive 16.

In addition to the antenna 32, the communication unit 30 of the aerial drone 12 comprises a further interface 36a which is assigned to an associated interface 36b of the mobile device 14, which interfaces are connected to one another for data exchange by a detachable plug connection 38.

The mobile device 14 comprises two units 14a, 14b, namely a first unit 14a having a first housing 40 and a second unit 14b having a second housing 42. The first housing 40 and the second housing 42 are releasably connected to each other via a plug connection 44 to form a unit constituting the mobile device 14. There is a set of different first units 14a on one side and a set of different second units 14b on the other side, which units can be individually configured and adapted to the respective needs by simply connecting them together.

In the first housing 40, [there is] a first computer 46, an actuator in the form of a motor-driven movable arm 48, a motor 50 cooperating with the arm 48, a tool unit 52 arranged on the arm 48 and comprising a feed unit 54 and a rotation unit 56. A tiller 58 is provided as a tool on the distal end of the rotation unit 56. The motor 50 drives both the arm 48 and the feed unit 54, the rotation unit 56 and thus also the tiller 58. The arm 48 may be of multi-part design and have various joints, which are not shown here since such motor-driven kinematic units are known. The arm 48 is used to move the tool unit 52 relative to the aerial drone 12 to its area of use, so that the tool unit 52 with the feed unit 54 and the rotation unit 56 can use the tiller 58 to process the plants, for example to remove weeds, and/or to till the soil.

Furthermore, a communication unit 60 and a visual detection unit 62 are arranged in the first unit 14a. The visual detection unit 62 comprises a camera 64 that captures images, a segmentation and data reduction device 66, a classifier 68 that performs classification of a plurality of pixel fields composed of pixels based on an intermediate image or intermediate data generated by the segmentation and data reduction device 66, as will be described in more detail below. The visual detection unit 62 is connected to the communication unit 60.

The first unit 14a has an interface 70a which is associated with an interface 70b of the second unit 14b. Communication link 72 is used to connect the communication unit 60 via interface 70a to interface 70b, and via this to a communication unit 74 in the second unit 14b. Via interface 36b, the communication unit 74 of the second unit 14b is connected via the plug-type connection 38 to interface 36a and to the communication unit 30 of the aerial drone 12.

A second computer 76 and a database 78 are furthermore provided in the second unit 14b.

Figure 2:
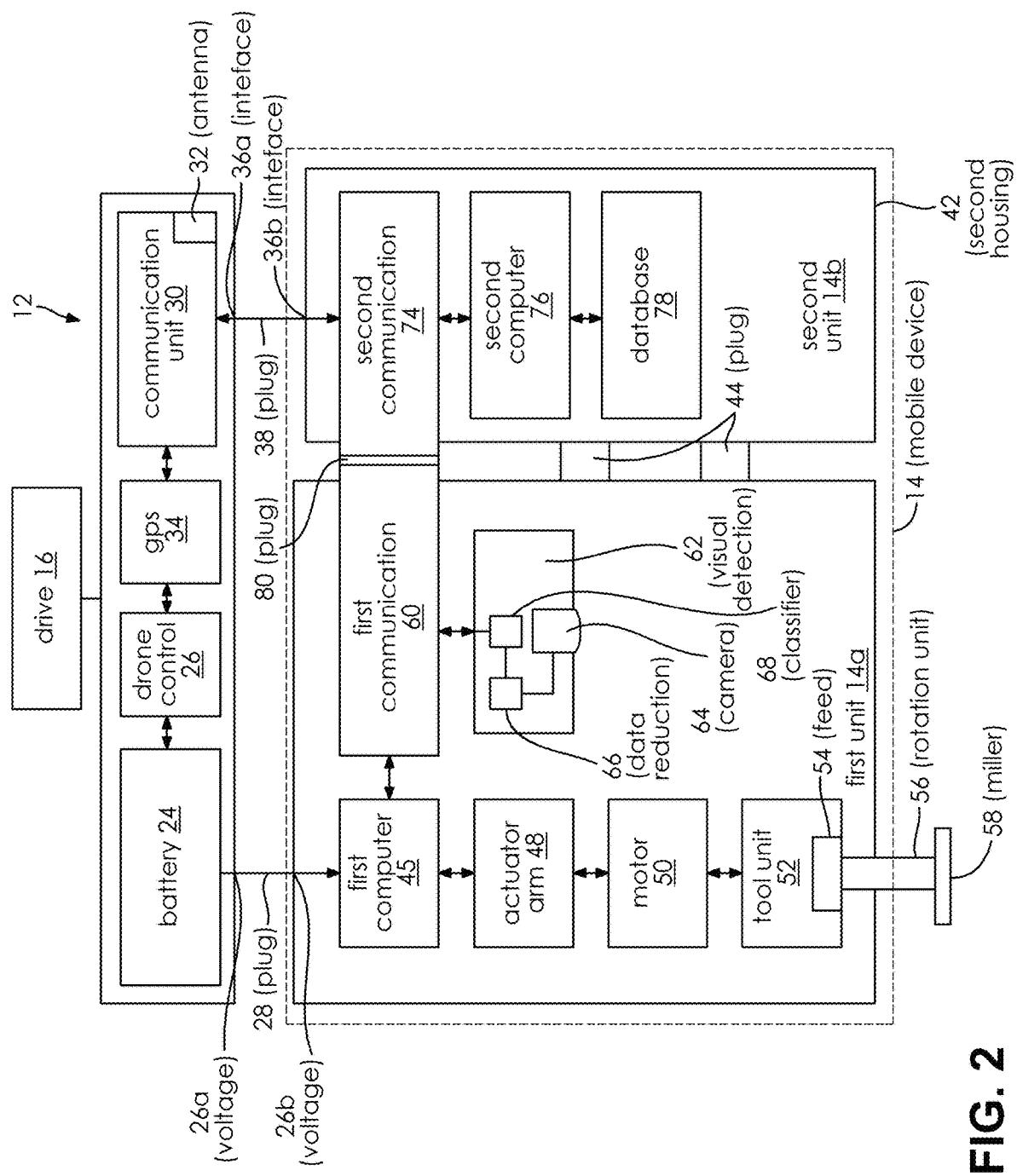
FIG. 2 is a schematic view of a carrier system with spatially separated housings of a mobile device, which housings are connected to each other via a plug-type connection, according to a second embodiment of the invention.

Illustrated in FIG. 2 is a further embodiment of the carrier system 10, with the design of the aerial drone 12 being identical to that of the first embodiment. Only the mobile device 14 differs by a plug-type connection 80 between the first unit 14a and the second unit 14b, which furthermore also detachably connects the communication unit 60 of the first unit 14a to the communication unit 74. By simply plugging them together, different first units 14a can be combined with different second units 14b to form a mobile unit 14.

Figure 3:
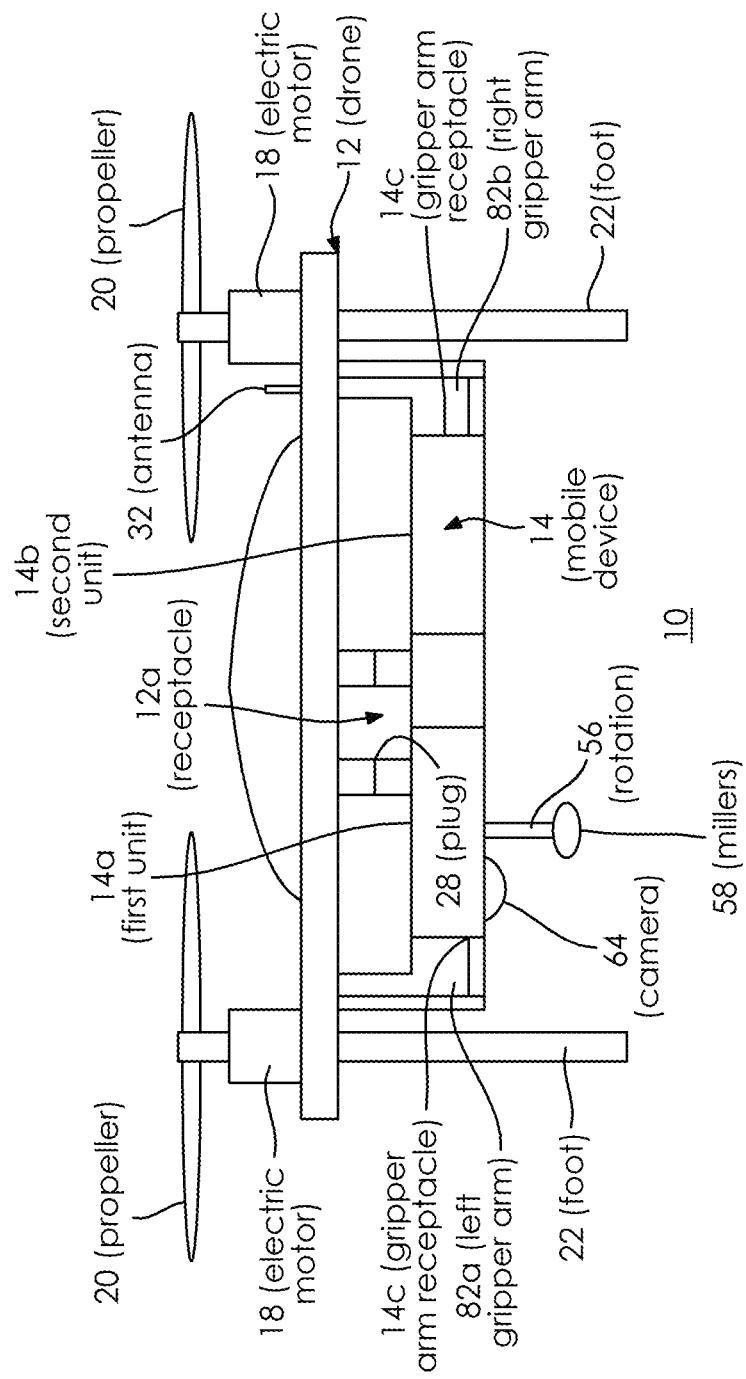
FIG. 3 is a lateral view of the carrier system according to the first embodiment of the invention, with the mobile device being connected to a aerial drone.

FIG. 3 is a lateral view of the aerial drone 12 in which only two of four electric motors 18 with associated propellers 20 are visible. Below each of the electric motors 18 the feet 22 are arranged. Two gripper arms 82a, 82b are provided between the feet 22, which are adapted to grasp and lift the mobile device 14, and to release and set it down again as required. The mobile device 14 comprises the two units 14a and 14b which are detachably connected to each other via the connector 80. In the first unit 14a, the camera 64 can be seen as part of the visual detection unit 62 as well as the tiller 58 at the distal end of the rotation unit 56.

The mobile device 14 can also be equipped with several different tool units 52 which are provided with a common arm 48 and, for example, a tool turret that will bring the required tool unit 52 into the activation position. However, it is also conceivable for the different tool units to each have their own actuator.

Figure 4:
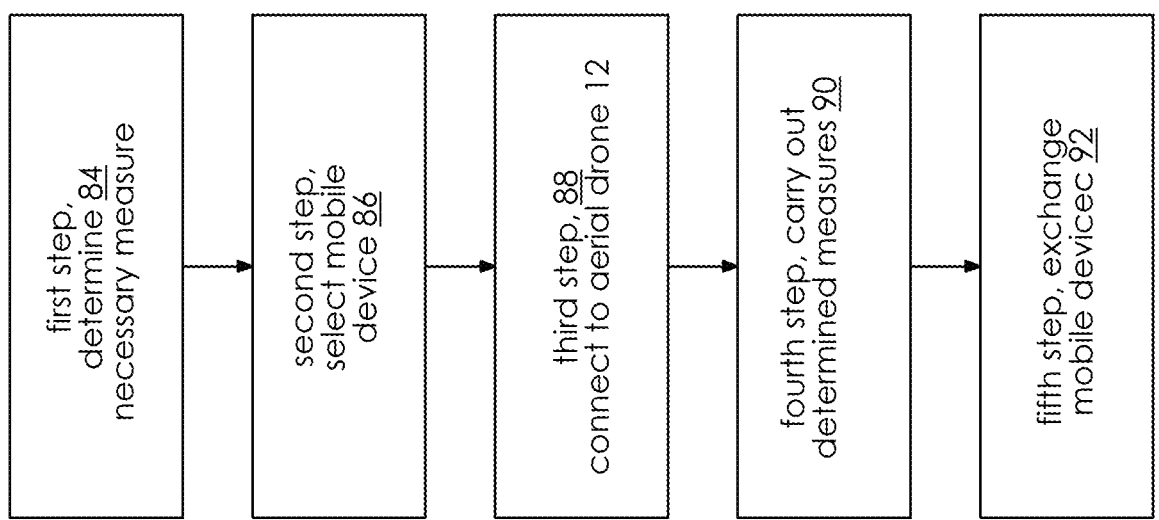
FIG. 4 is a flowchart illustrating the steps of a method using the carrier system.

The flowchart of FIG. 4 shows the steps that are performed in sequence in order to use the carrier system 10 for tilling the soil and for manipulating flora and fauna in agriculture.

In a first step 84, the carrier system 10 is first used to determine the measures required on the associated agricultural land. For this purpose, the carrier system 10 is for example brought to an agricultural area to be tilled, such as an agricultural field, or flown there directly from a central location. There the aerial drone 12 with the mobile device 14 then takes off and flies over the agricultural field. A stationary central computing unit supplies the carrier system 10 with the necessary data about the agricultural field to be surveyed. The central computing unit can also be a smartphone in this case. The visual detection unit 62 with the camera 64 of the mobile device 14 is used to capture images of the agricultural field. The images are evaluated and, after a comparison with data in the database 78, the necessary measures for this agricultural field are finally determined.

In a next step 86, based on the determined measures for the agricultural field or for partial areas of the agricultural field, the mobile unit 14 suitable for the necessary measure is then compiled from a set of first units 14a and a set of different second units 14b, which two units 14a, 14b are then connected to each other.

In a subsequent step 88, the gripper arm 82a and the gripper arm 82b, respectively, of the aerial drone 12 are used to grip the mobile unit 14 on the side and move it upwards towards the aerial drone 12 into a receptacle 12a of the aerial drone 12. In doing so, the voltage interfaces 26a, 26b are connected to each other via the connector 28 and the interfaces 36a, 36b are connected to each other via the connector 38. This supplies the mobile device 14 with voltage from the battery 24 of the aerial drone 12, and enables data exchange via the antenna 32 of the communication unit 30 of the aerial drone 12 with the communication units 60 and 74 of the mobile device 14 on the one hand and with a central processing unit on the other hand. As stated above, the central computing unit, which is independent of the carrier system 10, can also be a smartphone.

In a next step 90, the determined measures are performed using the carrier system 10 in the agricultural field. For example, the aerial drone 12 flies to the area of the agricultural field to be tilled. The arm 48 carrying the tool unit 52 moves to the weed to be removed. The feed unit 54 displaces the tiller 58 towards the weed in such a way that the weed will be milled away upon activation of the rotation unit 56.

In a fifth step 92, the aerial drone 12 then flies back, and exchanges the mobile device 14 for another mobile device 14 optimized for a different action, for example a pesticide or fertilizer applicator.

Alternatively, steps 86 and 88 may also be omitted if the aerial drone 12 is already ready for the action to be performed.

Figure 5:
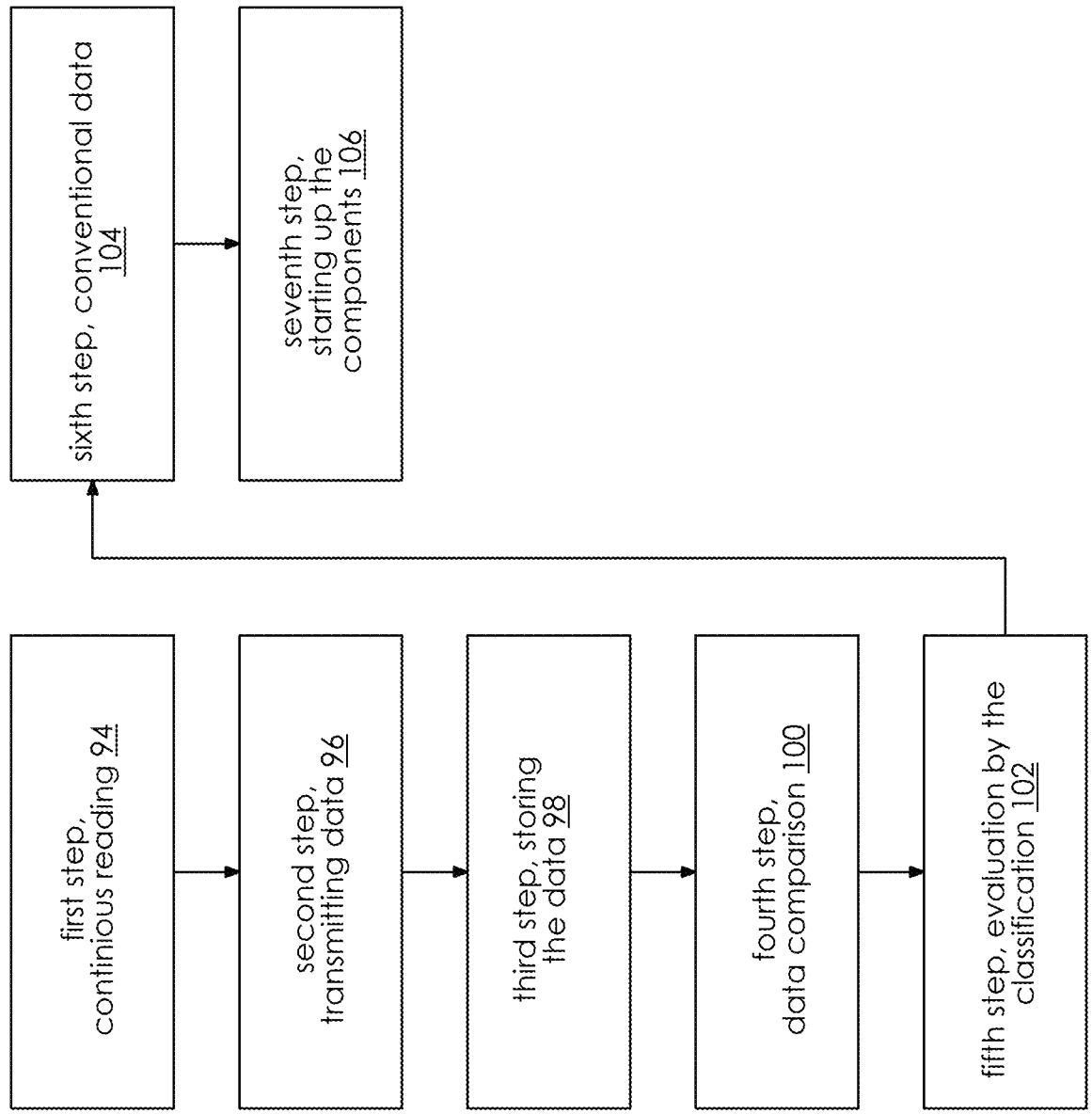
FIG. 5 is a flowchart illustrating the steps of a method used to determine the necessary measures.

With reference to FIG. 5, the determination of the necessary measures by the carrier system 10, in particular by the mobile device 14, will now be explained in detail.

In a first step 94, the continuous recording of data of technically defined voxels and/or pixels and/or images by the visual detection unit 62 of the mobile device 14 is performed. The voxels, pixels and images constitute recorded data which is continuously transmitted to the database 78—second step 96.

In a third step 98, the recorded data is stored.

In a fourth step 100, a qualitative data comparison of the recorded data with the data stored in the database 78 is performed. Here, a segmentation and data reduction of the recorded data is carried out by the segmentation and data reduction device 66. In particular, verification of the recorded data may also be performed by the second computer 76.

In a fifth step 102, evaluation is performed by the classifier 68 in conjunction with the second computer 76, supported by artificial intelligence, as will be detailed below.

Finally, in a sixth step 104, the processing and conversion of the evaluation by the first computer 46 into control data for the motor 50, the arm 48, the tool unit 52 and the aerial drone 12 is performed.

Finally, in a seventh step 106, the motor 50, the arm 48, and the tool unit 52 are started up for tilling the soil or for manipulating flora and fauna.

Where mention is made in this application of artificial intelligence, this relates to, among other things, the use of a classical convolutional neural network—CNN—of one or more convolutional layer(s) followed by a pooling layer. Basically, this sequence of convolutional and pooling layers can be repeated any number of times. Usually, the input is a two- or three-dimensional matrix, e.g. the pixels of a grayscale or color image. The neurons are arranged accordingly in the convolutional layer.

The activity of each neuron is calculated via a discrete convolution (convolutional layer). This involves intuitively moving a comparatively small convolution matrix (filter kernel) step by step over the input. The input of a neuron in the convolutional layer is calculated as the inner product of the filter kernel with the respective presently underlying image section. Accordingly, adjacent neurons in the convolutional layer will react to overlapping areas.

A neuron in this layer responds only to stimuli in a local environment of the previous layer. This follows the biological model of the receptive field. In addition, the weights for all neurons of a convolutional layer are identical (shared weights). This results in each neuron in the first convolutional layer encoding the intensity to which an edge is present in a certain local area of the input, for example. Edge detection as the first step of image recognition has high biological plausibility. It immediately follows from the shared weights that translation invariance is an inherent property of CNNs.

The input of each neuron, determined by discrete convolution, is now transformed by an activation function, for CNNs usually Rectified Linear Unit, or ReLu ($f(x)=\max(0, x)$), into the output that is supposed to model the relative firing frequency of a real neuron. Since backpropagation requires the computation of gradients, a differentiable approximation of ReLu is used in practice: $f(x)=\ln(1+e^x)$. As with the visual cortex, in deeper convolutional layers there is an increase both in the size of the receptive fields and in the complexity of the recognized features.

In the subsequent step, pooling, superfluous information is discarded. For object recognition in images, for example, the exact position of an edge in the image is of negligible interest—the approximate localization of a feature being sufficient. There are different types of pooling. By far the most common type is max-pooling in which of each 2×2 square of neurons in the convolutional layer, only the activity of the most active (hence "max") neuron is retained for further computational steps; the activity of the remaining neurons is discarded. Despite the data reduction (75% in the example), the performance of the network is usually not reduced by pooling.

The use of the convolutional neural network and the segmentation and data reduction device 66 is explained in more detail below with reference to FIGS. 6 through 14.

There are various approaches for the classification of all objects in an image by the classifier 68. Many approaches start by first finding the individual objects in the image and then classifying them. However, this is not always possible. Let us look at the classification of plants 108 in a field as an example. An example image 108 is shown in FIG. 6.

Figure 6:
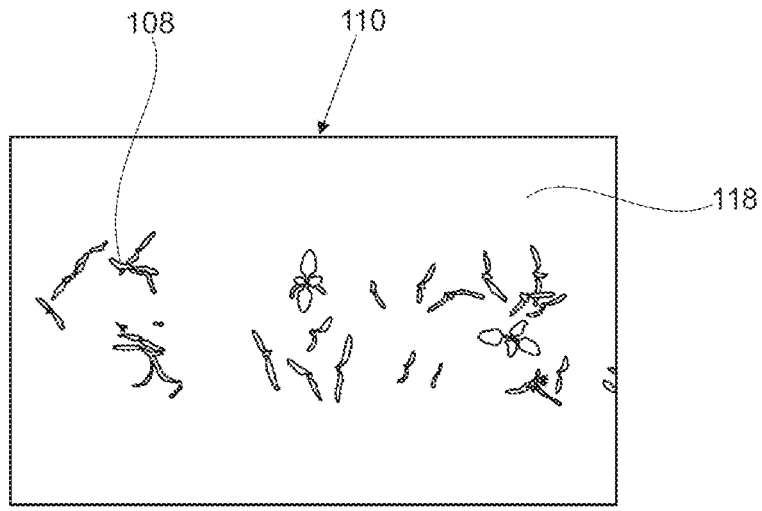
FIG. 6 is an image captured by the visual detection unit.

FIG. 6 shows various plants 108 that are all to be classified by the classifier 68, which classification is to be performed in real time. Real time in this case refers to the camera rate of 10 frames per second. Since, as in this example, it is not easy to distinguish where exactly a plant 110 ends, a different approach must be used, since the computation time is not sufficient to first distinguish the plants 110 and then to classify them.

The image 108 shown in FIG. 6 is made up of pixels, and each pixel can logically contain precisely one class only. Therefore, a trivial approach would be to classify the entire image 108 pixel by pixel. This means that pixel after pixel is each assigned to a class.

However, since a single pixel does not contain sufficient information to determine which class it belongs to, a surrounding area must be used for the classification. This area can then be classified using a convolutional neural network (CNN) as described above. The network can be of a sequence as illustrated in FIG. 7.

Figure 7:
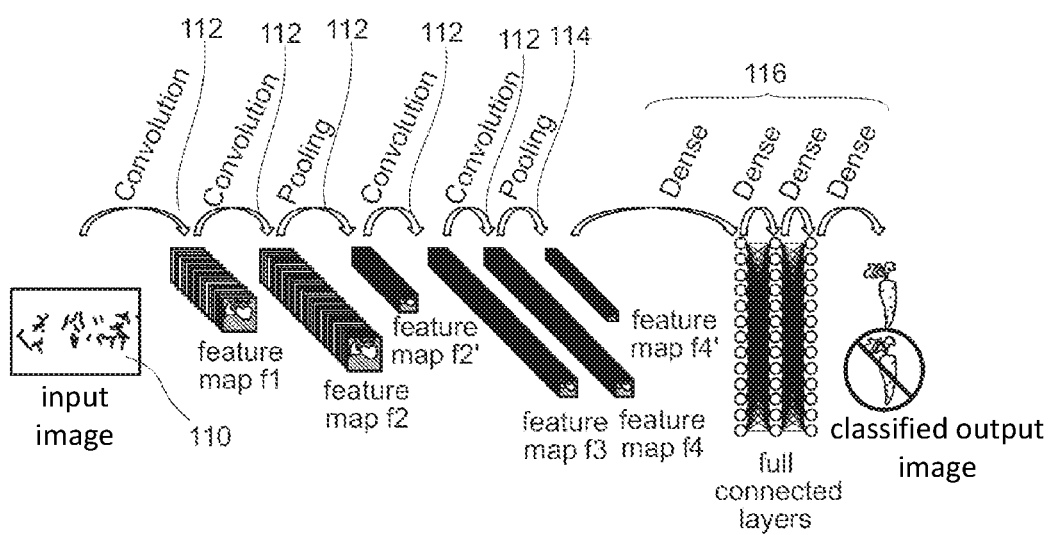
FIG. 7 is a schematic diagram of a convolutional neural network on the basis of the image of FIG. 6.

The input image 110 of FIG. 7 is the image of FIG. 6. The elements of the CNN are now applied to this input image 110. In this example, these elements are a convolution 112 with the features, subsequent pooling 114, another convolution with additional features, another pooling and a consolidation in the dense layer 116. The output of the network then indicates which class the center pixel of the input image 110, respectively a pixel of the image 110 of FIG. 6, belongs to.

Subsequently, a new image section, usually an image section that is shifted by one pixel, is selected and classified again using CNN. As a result of this procedure, the calculations required by the convolutional neural network must be repeated for the number of pixels to be classified. This is time consuming. Image 110 of FIG. 6 has a resolution of 2,000×1,000 pixels. Thus, the CNN would have to be computed two million times. However, the initial problem is only the classification of the plants 108 per se. On average, such an image contains about 5% plant pixels, corresponding to only approx. 100,000 pixels.

Figure 8:
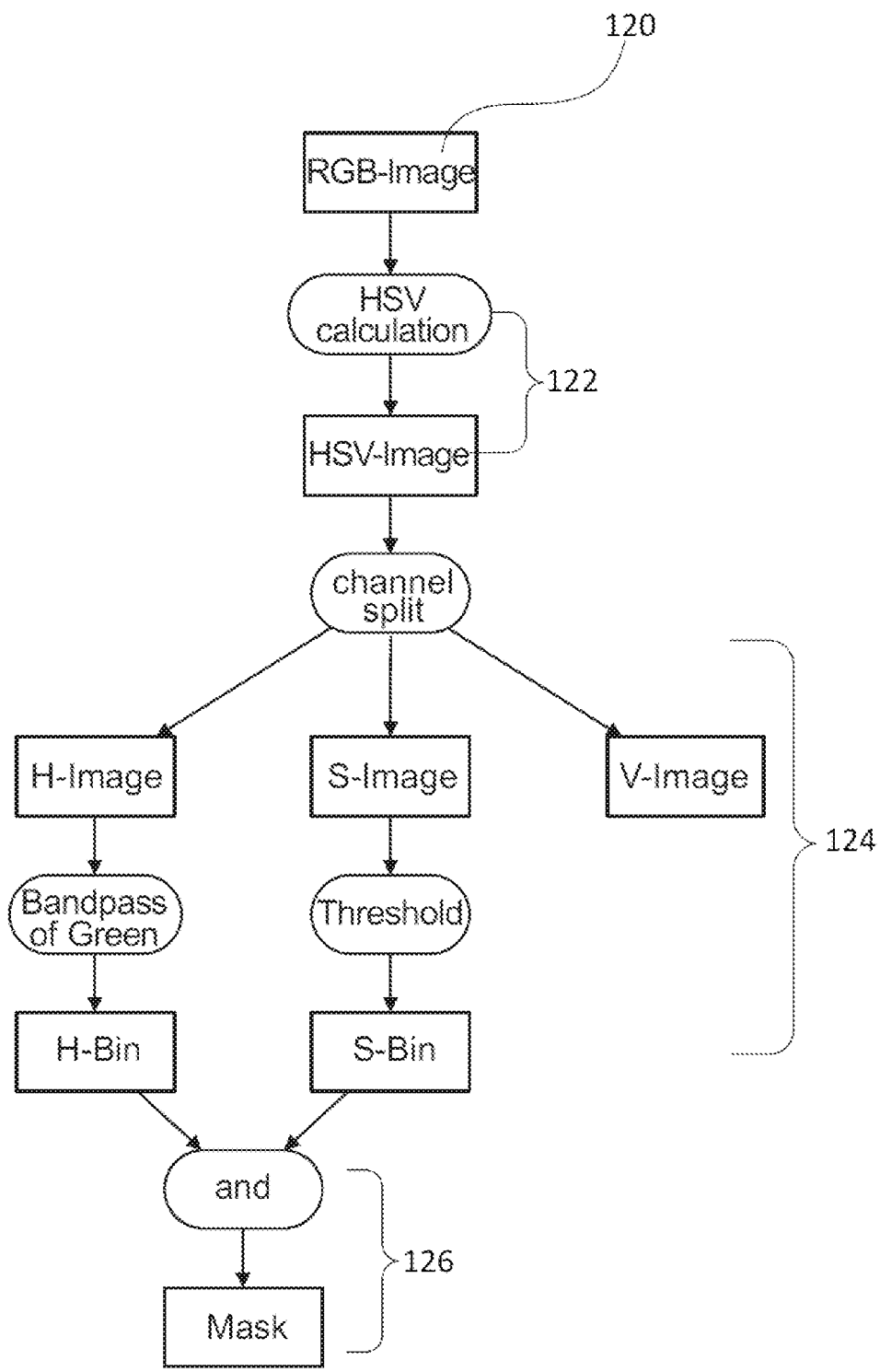
FIG. 8 is a flowchart depicting a method used by the segmentation and data reduction unit.

By means of simple segmentation and data reduction by the segmentation and data reduction unit 66, it can be determined whether a pixel is a representation of a part of a plant 108 or of a background 118. In terms of computation, this segmentation is not as complex as a CNN and therefore faster. The segmentation and data reduction by the segmentation and data reduction unit 66 is performed in the same way as in FIG. 8. The individual steps of this process are shown in FIG. 8.

In a first step 120, each image of multiple pixels transmitted to the database 78 is converted to the RGB (red, green, and blue) color model.

In a next step 122, each pixel of the transmitted image is converted to an HSV (hue, saturation, value) color model based on the RGB color model.

In a next step 124, this HSV color model is evaluated.

Each pixel based on the HSV color model is evaluated with respect to color saturation according to a threshold value, wherein, if the color saturation value exceeds a threshold value, the pixel is assigned the binary value 1, and if the color saturation value falls below a threshold value, the pixel is assigned the binary value 0.

Parallel thereto, based on the HSV color model, each pixel is evaluated with respect to the hue angle based on a predetermined range, wherein, if the hue angle is within the predetermined range, the pixel is assigned the binary value 1, and if the hue angle is outside the range, the pixel is assigned the binary value 0.

In a next step 126, the binary hue angle and color saturation information is used to generate an intermediate image that contains significantly less data than the image 108 generated by the camera.

The segmentation illustrated in FIG. 8 results in the formula given below, which must be applied to each pixel. The layout of the RGB image $\psi(x,y)$ is used to divide the segmented image $S(x,y)$ into its three components red, green and blue. A pixel of the segmented image is then set to 1 if the minimum value of red, green or blue of a pixel divided by the green pixel is less than or equal to a threshold value (THs). Which threshold value in the 8 bit space of the image is determined by scaling using 255. If the threshold value is not reached, the pixel of the segmented image is set to 0, as in equation 1.

$$S(x, y) = \begin{cases} 1 & \text{if } \frac{\text{MIN}(\psi_{Red}(x, y), \psi_{Green}(x, y), \psi_{Blue}(x, y))}{\psi_{Green}(x, y)} \leq \frac{255 - THs}{255}. \\ 0 & \text{otherwise} \end{cases} \quad (1)$$

Figure 9:
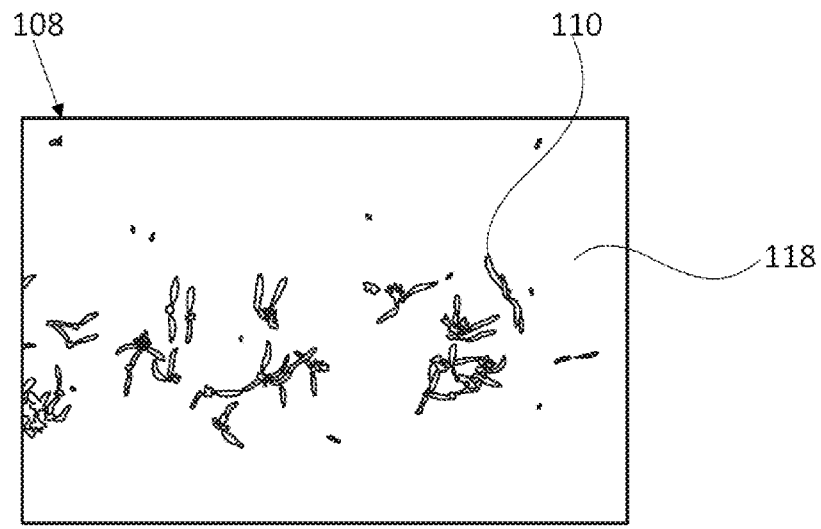
FIG. 9 is an intermediate image created by the segmentation and data reduction unit.

This results in the first optimization: before the entire image 108 is decomposed into two million images, the segmentation according to FIG. 8 is used. That is, the entire image 108 is analyzed pixel by pixel and a decision is made, using the above formula, as to whether or not it is a plant pixel. Firstly, the image 108 is segmented, that is, the background 118 is set to black (0), as shown in FIG. 9. Secondly, if it is a plant pixel, its coordinates are written into a list. Then, only those coordinates that are also in this list are input into the CNN. The unnecessary pixels of the soil, i.e. the background 118, are omitted. Thus, the CNN is called about 20 times fewer.

Figure 10:
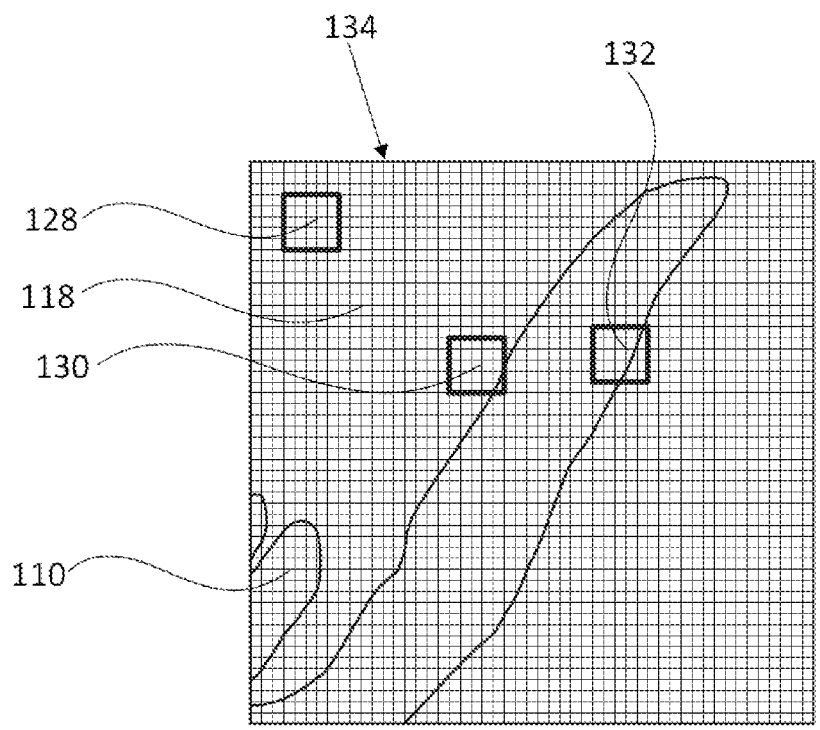
FIG. 10 is a view of part of the intermediate image with three different cases for the classifier.

As a result of the segmentation, the background 118 is set to the value 0. The image elements that the CNN looks at now also have segmented images. Normally, in a convolution layer, the feature calculation would be applied to each pixel of the image element. However, this results in three cases 128, 130, 132 for the calculation, which are shown in FIG. 10, each for a feature 134 of a size of 5×5 pixels.

The Red case 128 shows a feature calculation in which the feature is completely on the background 118. Here, each element is multiplied by 0, which results in the entire calculation being 0, or the bias value. The result of this calculation is therefore already known before the calculation. Even if the background 118 were non-zero, i.e. contained soil, this calculation would not include any information about the plant 110, so the result may simply be a constant fictitious value.

In the Yellow case 130, the mean feature value is not on a plant 110. This means that part of it is also a multiplication by zero. In this case, the plant 110 is distorted in the margin and thus made larger in the feature map.

In the Blue case 132, at least the center pixel of the feature is on a plant.

After considering these three cases 128, 130, 132, only the Yellow and Blue cases 130 and 132 need to be calculated, i.e. the cases 130, 132 in which the feature has at least one non-zero input value. The results of all the other feature computations are known before the computation, they are zero and/or only the bias value. The coordinates in which the Blue case 132 occurs are known. These are the coordinates stored during the segmentation. For the Yellow case 130, a computation must again be made whether this case has occurred. This requires a check of each plant pixel found in the segmentation. Since such a check is too much effort and the Yellow Case 130 only occurs in the border area of a plant 110, this case shall be ignored.

Therefore, the calculation can be optimized in that the feature calculation and all other elements of the CNN are only applied to the plant pixels found.

Figure 11:
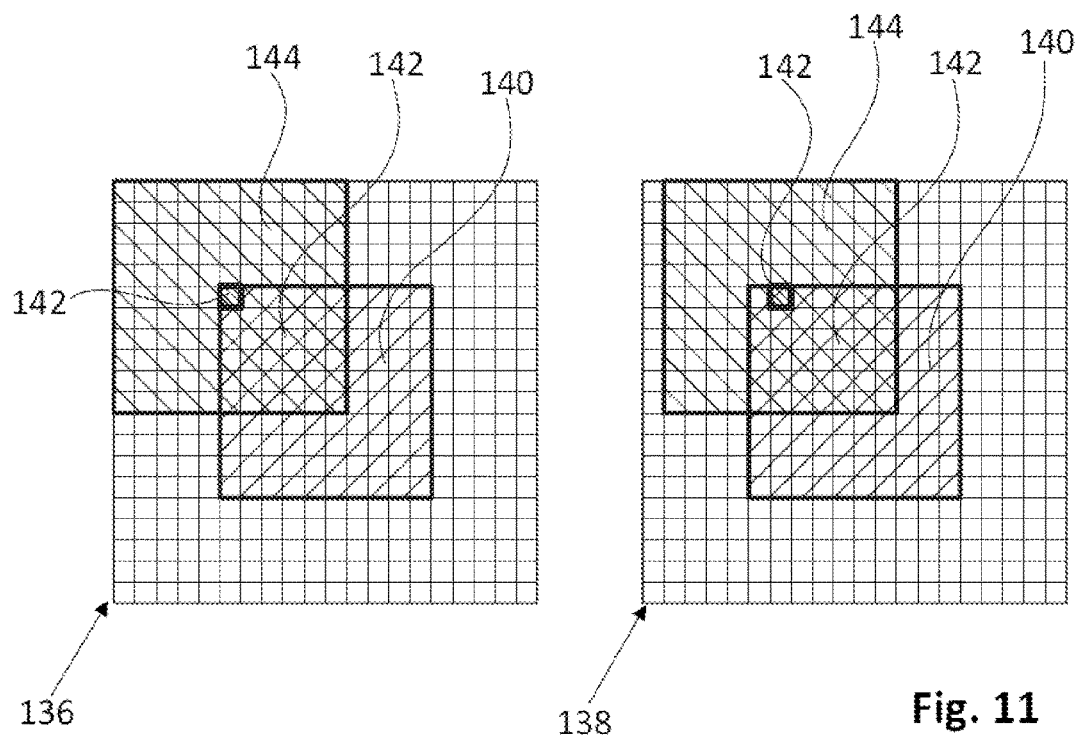
FIG. 11 is a view of two principle representations of further pixel fields for evaluation by the classifier.

FIG. 11 is a schematic view illustrating how two neighboring plant pixels 136, 138 differ from each other. On the left is a plant pixel 136 and on the right is an adjacent plant pixel 138. The Blue/Purple area 140, 142 could be different plants that need to be classified. The Red/Purple area 144, 142 represents the image element that the CNN is looking at in order to classify the orange pixel 146.

Closer inspection shows that there is a significant overlap in the region under consideration (Red/Purple) 144, 142. This in turn means that both image elements 136, 138 contain mostly the same values. If the CNN now calculates the feature in the convolution layer, the same values would also be obtained in the feature calculation.

Figure 12:
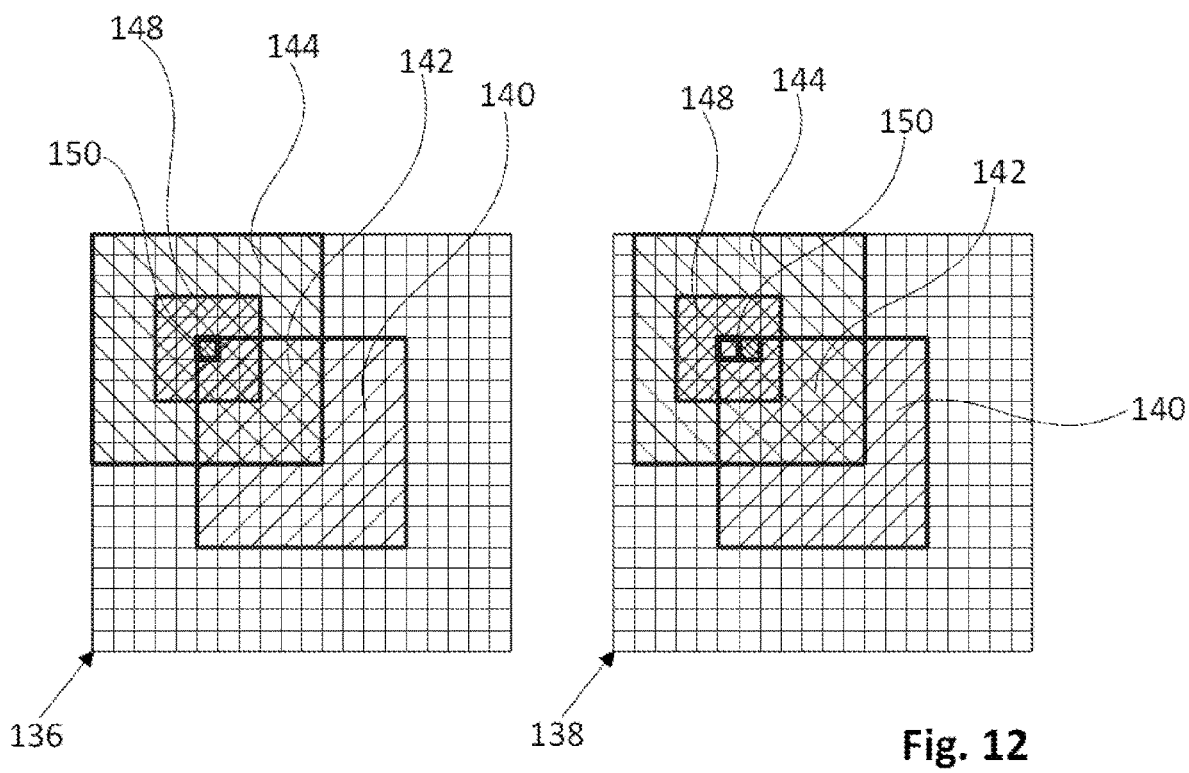
FIG. 12 is a view of two principal representations of further pixel fields for evaluation by the classifier.
Figure 13:
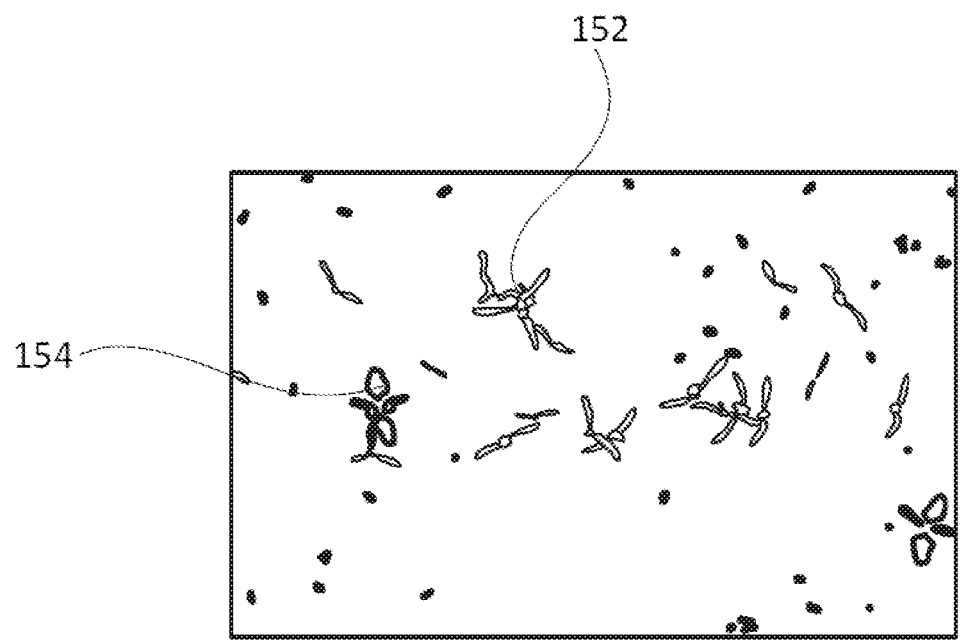
FIG. 13 is an image created and evaluated by the classifier.

In FIG. 12, a feature 148 of a size of 5×5 pixels is schematically sketched in green. This feature 148 is located at the same coordinates within the entire image, but it is displaced within the image element (red/purple) 144, 142 to be viewed by the CNN. However, since its location is the same throughout the image, the calculation for the center black box 150 would yield the same value in both the left image 136 and the right image 138. This finding can be applied to all elements of a CNN. As a result, provided the edge region is ignored, the single feature calculation can be applied to the entire image first. Theoretically, the decomposition of the input image 108 only plays a decisive role at the dense layer 116 level. The dense layer 116 can, however, be computed in the same way as a convolution 112. In this case, the feature size results from the interaction of input image size and the existing pooling layers in the network. This allows the classification to be further optimized; CNN elements are now applied only to the plant pixels found. The feature map calculated from the last convolution represents the classification result as shown in FIG. 13. Here, pixel by pixel, all carrot plants 152 are classified in green and all weeds 154 are classified in red.

However, these optimizations also cause changes in the classification result. The pooling layers have the greatest influence here. With each pooling, information is removed from the network. However, because the image elements are no longer considered individually, local reference is lost for the pooling. This problem is illustrated in FIG. 14.

Figure 14:
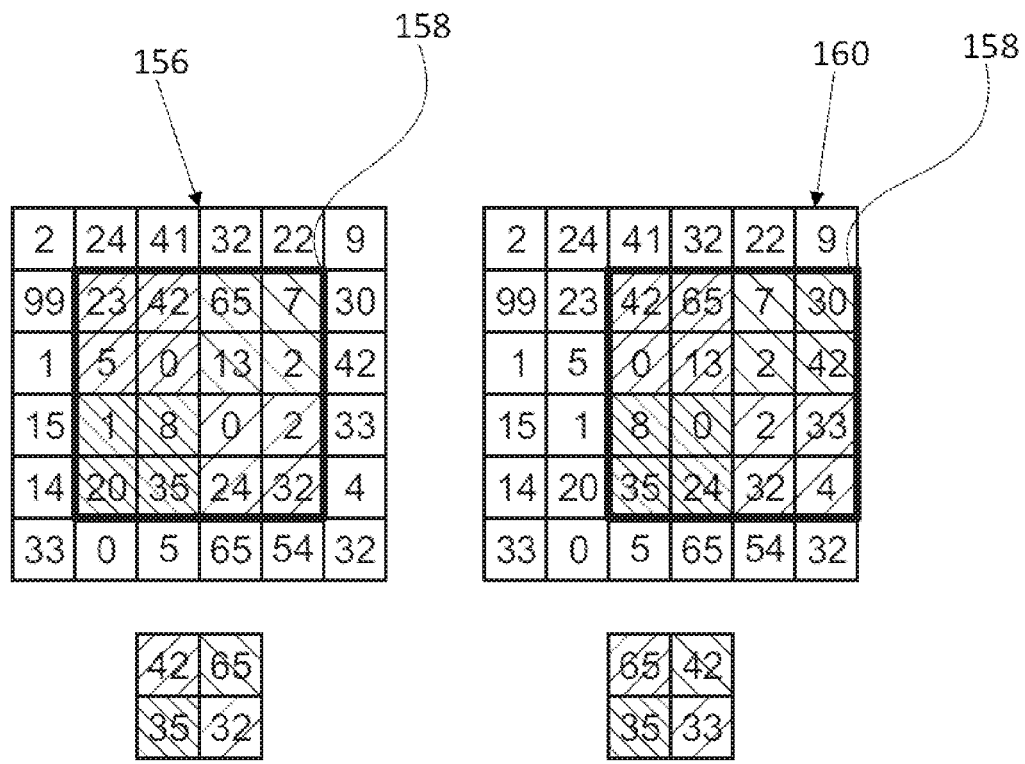
FIG. 14 is a view of schematic representations of the operation of the classifier.

In FIG. 14, a picture element 156 is shown as a red frame 158. Prior to optimization, each pixel would be run individually through the CNN in order to classify its center pixel. The right image element 160 is shifted one pixel further to the right. The four colors: purple, blue, yellow and green indicate the individual applications of pooling. As can be seen, they can give different results, because pooling always starts at the edge and moves one pooling element further (two fields in this case). This results in two different pooling elements from two adjacent image elements 156, 160. As a result, if this is to be considered in the optimization, each pooling would result in two new branches for the further calculation. Since the pooling would have to be applied once to the entire image, it [would have to have] its starting point at the top left, and another pooling [would have to have] its starting point at the top left plus one pixel. In the further calculation both pooling results would then have to be processed separately. Another second pooling would result in two new paths again, so that four separate results would have to be calculated. The result is then composed of the four results rotating pixel by pixel. If only one path is considered after pooling, the output image would be smaller after pooling twice. The length and width of the output image would then each be only ¼ as large as the input image. Considering all paths would result in approximately the input image size.

Another difference is represented by the missing edge regions of the plants. Since the features are not applied to all elements in which there is any overlap with the plant, computational differences exist here. This may also change the classification result compared to the conventional calculation.

The missing calculation of the feature values outside the plant can result in other values in that the result is given as zero, which in reality is the bias value, however.

While these three factors do affect the results, this still shows that the CNN is very robust and thus the results still meet a very high accuracy value.

The next step would be to train the network directly with these modifications, so that the network can adapt even better to its new calculation and thus compensate for any errors directly in the calculation.

The segmentation and data reduction device provides the pixels relating to the weed 154 with position coordinates.

LIST OF REFERENCE SIGNS 10 carrier system
12 aerial drone
12a receptacle, receiving space of the aerial drone 12
12b aerial drone control device
14 mobile device
14a first unit
14b second unit
14c gripper arm receptacle on mobile device 14
16 drive
18 electric motor
20 propeller
22 feet
24 battery
26a voltage interface on aerial drone 12
26b voltage interface on mobile device 14
28 plug connection
30 communication unit
32 antenna
34 GPS unit
36a interface on aerial drone 12
36b interface on mobile device 14
38 plug connection
40 first housing of first unit 14a
42 second housing of second unit 14b
44 plug connection
52 tool unit
54 feed unit
56 rotation unit
58 miller
60 first communication unit of first unit 14a
62 visual detection unit
64 camera
66 segmentation and data reduction unit
68 classifier
70a interface of first unit 14a
70b interface of second unit 14b
72 communication link
74 second communication unit of second unit 14b
76 second computer
78 database
80 plug connection
82a left gripper arm
82b right gripper arm
84 first step: determine necessary measures
86 second step: select mobile device 14 from available mobile devices 14
88 third step: connect device to aerial drone 12
90 fourth step: carry out determined measures
92 fifth step: exchange mobile device 14 for another mobile device 14 and carry out another measure
94 first step: continuous recording
96 second step: transmitting the data
98 third step: storing the data
100 fourth step: data comparison
102 fifth step: evaluation by the classifier 68
104 sixth step: conversion into control data
106 seventh step: starting up the components
108 example image, input image
110 plant
112 convolution
114 pooling
116 feeding into in a dense layer
118 background
120 first step: convert into a RGB color model
122 second step: convert into an HSV color model
124 third step: evaluate HSV image
126 fourth step: create an intermediate image
128 first case, red
130 second case, yellow
132 third case, blue
134 feature
136 left plant pixel
138 right plant pixel
140 blue area
142 purple area
144 red area
146 orange area 148 feature, green
150 center black box
152 carrot plant
154 weeds
156 left image element
158 red frame
160 right picture element

The invention claimed is:

1. A carrier system (10) comprising a carrier (12) and a mobile device (14) for working the soil and/or for manipulating the flora and fauna wherein:
   said carrier (12) having:
   a drive (16) for moving said carrier system (10),
   a control system (12b), said control system (12b) controls said drive (16) and includes pre-defined movements of said carrier system (10),
   an energy source (24) having a voltage, said voltage applied to and operates said drive (16),
   a detachable voltage plug connection,
   a detachable communication plug connection,
   a right gripper arm (82b) and a left gripper arm (82a),
   a receptacle (12a) for receiving and connecting to said mobile device (14);
   said carrier (12) and said mobile device (14) further include:
   a first gripper receptacle (14c) and a second gripper receptacle (14c) on said mobile device receive and interengage said right gripper arm (82b) and said left gripper arm (82a) of said carrier, and, during said interengagement of said gripper receptacles (14c, 14c) of said mobile device (14) and said gripper arms (82a, 82b) of said carrier (12), said gripper arm (82a) and said gripper arm (82b), respectively, of said carrier (12) grip said mobile device (14) and move said mobile device (14) upwards toward said carrier (12) into said receptacle (12a) of said carrier (12),
   a voltage interface (26a) is on said carrier (12) and a voltage interface (26b) corresponding to said voltage interface (26a) is on said mobile device (14), said voltage interfaces (26a, 26b) are connected to one another via said detachable plug connection (28) whereby voltage and power are transferred from said carrier (12) to said mobile device (14),
   a first data communication interface (36a) on said carrier (12) and a second data communication interface (36b) on said mobile device (14), said data communication interfaces (36a, 36b) are connected to one another via said detachable plug connection (38),
   a communication unit (30),
   first data communication interface (36a) co-operates with said second data communication interface (36b) and with said communication unit (30) in order to exchange data by and between said carrier (12) and said mobile device (14),
   a second communication interface (32) that co-operates with said communication unit (30) and that receives control data and forwards said control data to said control system (12b), and,
   said control system (12b) renders said pre-defined movements of said carrier system (10).

2. The carrier system according to claim 1, characterized in that said carrier (12) is selected from the group consisting of an unmanned aircraft (aerial drone), an unmanned land vehicle, an unmanned watercraft, and, an unmanned underwater vehicle.

3. The carrier system according to claim 1, characterized in that said second communication interface is an antenna (32) for data exchange with a central stationary computer separate from said carrier (12) and said mobile device.

4. The carrier system according to claim 3, characterized in that a second communication interface (32) is for data exchange with said mobile device (14) and said central stationary computer located remotely from said carrier (12) and said mobile device (14).

5. The carrier system according to claim 1, characterized in that said carrier (12) and said mobile device (14) have a voltage connection (26a, 26b) which supplies said mobile device (14) with said voltage from said battery (24).

6. The carrier system according to claim 1, characterized in that
   said carrier system has GPS coordinates,
   said carrier comprises a GPS unit (34) for detecting said position coordinates of said carrier system (10).

7. The carrier system according to claim 1, characterized in that said mobile device (14) comprises:
   at least one sensor (62),
   a tool unit (52) with at least one motor-driven tool (58),
   an actuator (48) for moving at least said tool (58) of said tool unit (52),
   a motor (50) for driving said tool unit (52) and/or said actuator (48),
   a database (78),
   said data detected via said at least one sensor (62) are recorded in said database,
   a first communication unit (60, 74) with an interface (70a, 70b; 36a, 36b),
   a first computer (46, 76) for controlling said motor (50), said at least one sensor (62), said tool unit (52) and/or said actuator (48),
   wherein said data detected via said at least one sensor (62) are continuously compared with said data previously stored in said database (78) in order to generate corresponding control signals for said motor (50), said sensor (62), said tool unit (52), said actuator (48) and/or said carrier (12).

8. The carrier system according to claim 7, characterized in that said continuously compared data determined by said sensor (62) with data previously stored in said database (78) takes place in real time with a verification and classification of said data determined by said sensor (62).

9. The carrier system according to claim 7, characterized in that said sensor of said mobile device (14) is a visual detection unit (62) with a camera (64).

10. The carrier system according to claim 7, characterized in that said mobile device (14) is designed in two parts, wherein in a first unit (14a), said sensor (62), said tool unit (52), said motor (50) for driving said tool unit (52) and/or said actuator (48), said actuator (48), said first computer (46) and said first communication unit (60) of said device (14) with said interface (70a) are provided, and said database (78), a second computer (76) and a second communication unit (74) of said device (14) with said interface (36b, 70b) are provided in a second unit (14b), wherein said first unit (14a) and said second unit (14b) can be connected to one another for data exchange via said two interfaces (70a, 70b).

11. The carrier system according to claim 10, characterized in that said first unit (14a) comprises a first housing (40) and said second unit (14b) comprises a second housing (42).

12. The carrier system according to claim 11, characterized in that said first and second housings (40, 42) are detachably connected to each other via a plug-in connection (44, 80).

13. The carrier system according to claim 10, characterized in that said voltage connection (26b) is provided on said first unit (14*a*) and that said voltage connection is used to supply said first unit (14*a*) and said second unit (14*b*) with said voltage from said battery (24).

14. The carrier system according to claim 10, characterized in that said interface (36*b*) assigned to said carrier (12) for said data exchange of said mobile device (14) is arranged in said second unit (14*b*).

15. The carrier system according to claim 7, characterized in that said tool unit (52) of said mobile device (14) comprises at least one feed unit (54) and a rotation unit (56), wherein said units cooperate with said motor (50).

16. The carrier system according to claim 15, characterized in that mounted on a distal end of said rotation unit (56) is at least said tool (58), said tool is a miller or a blade unit.

17. The carrier system according to claim 1, characterized in that a plurality of different mobile devices (14) are provided, with only one mobile device (14) being arranged in said receptacle (12*a*) at a time.

18. The carrier system according to claim 17, characterized in that said mobile devices (14) have different sensors (62) and/or tool units (52).

19. A method for real-time control of the tilling of the soil and/or of the manipulation of the flora and fauna by a carrier system (10),
said carrier system (10) comprising a carrier (12) and a mobile device (14) for working the soil and/or for manipulating the flora and fauna wherein:
said carrier (12) having:
a drive (16) for moving said carrier system (10),
a control system (12*b*), said control system (12*b*) controls said drive (16) and includes pre-defined movements of said carrier system (10),
an energy source (24) having a voltage, said voltage applied to and operates said drive (16),
a detachable voltage plug connection,
a detachable communication plug connection,
a right gripper arm (82*b*) and a left gripper arm (82*a*),
a receptacle (12*a*) for receiving and connecting to said mobile device (14);
said carrier (12) and said mobile device (14) further include:
a first gripper receptacle (14*c*) and a second gripper receptacle (14*c*) on said mobile device receive and interengage said right gripper arm (82*b*) and said left gripper arm (82*a*) of said carrier, and, during said interengagement of said gripper receptacles (14*c*, 14*c*) of said mobile device (14) and said gripper arms (82*a*, 82*b*) of said carrier (12), said gripper arm (82*a*) and said gripper arm (82*b*), respectively, of said carrier (12) grip said mobile device (14) and move said mobile device (14) upwards toward said carrier (12) into said receptacle (12*a*) of said carrier (12),
a voltage interface (26*a*) is on said carrier (12) and a voltage interface (26*b*) corresponding to said voltage interface (26*a*) is on said mobile device (14), said voltage interfaces (26*a*, 26*b*) are connected to one another via said detachable plug connection (28) whereby voltage and power are transferred from said carrier (12) to said mobile device (14),
a first data communication interface (36*a*) on said carrier (12) and a second data communication interface (36*b*) on said mobile device (14), said data communication interfaces (36*a*, 36*b*) are connected to one another via said detachable plug connection (38),
a communication unit (30),
said first data communication interface (36*a*) co-operates with said second data communication interface (36*b*) and with said communication unit (30) in order to exchange data by and between said carrier (12) and said mobile device (14),
a second communication interface (32) that co-operates with said communication unit (30) and that receives control data and forwards said control data to said control system (12*b*), and,
said control system (12*b*) renders said pre-defined movements of said carrier system (10),
comprising the following steps of:
determining the necessary measures, said determining necessary measures being a determination of the need for tilling and working said soil, and said determining necessary measures being a determination of the need for manipulating said flora or fauna wherein said determination of said necessary measures is carried out by a mobile device (14) as follows:
a. continuous recording over time of data-defined voxels and/or pixels and/or images by a said sensor (62) of said mobile device (14);
b. transmission of said recorded data to a database (78);
c. storage of said recorded data in said database (78);
d. qualitative data comparison of said recorded data with said data stored in said database (78), while performing segmentation, data reduction, and/or verification of said recorded data with a computer (46, 76);
e. evaluation of said compared recorded data with existing defined data sets in said database (78) by a classifier (68) in connection with said computer (46, 76); and
f. processing and conversion of said evaluation by said computer (46, 76) into control and control-related data for a motor (50), an actuator (48), a tool unit (52) and/or a carrier (12); and, performing said necessary measures.

20. The method according to claim 19, characterized in that between determining said necessary measures and performing said determined measures, the following additional steps are performed:
selecting a mobile device (14) from a group of prepopulated devices (14), said prepopulated devices perform specific work duties; and,
connecting said selected mobile device (14) to said carrier (12).

21. The method according to claim 19, characterized in that said mobile device (14) is exchanged for another mobile device (14) after performing said measure, and another measure is then performed.

22. The method according to claim 19, characterized in that said determined measures are carried out based on said evaluation by said computer (46, 76) and conversion of said evaluation into control and/or control-related data for said motor (50), said actuator (48), said tool unit (52) and/or said carrier (12) and by starting up said motor (50), said actuator (48), said tool unit (52) and/or said carrier (12) for tilling said soil and/or for manipulating flora and fauna.

23. The method according to claim 19, characterized in that said evaluation is carried out in a computer (46, 76) cooperating with said classifier (68), said second computer (76), and said processing and conversion of said evaluation into control and/or control-related data is carried out in another computer (46, 76), said first computer (46), for which purpose said evaluation is transmitted from said one computer (46, 76) to said other computer (46, 76).

24. The method according to claim 19, characterized in that the storage, the qualitative data comparison of the recorded data with data stored in the database (78) and/or the evaluation by the classifier (68) are supported by artificial intelligence.

25. The method according to claim 19, characterized in that during data comparison, said recorded data is transmitted to said segmentation and data reduction device (66) which generates intermediate images.

26. The method according to claim 25, characterized in that after said intermediate images have been generated, they are transmitted to said classifier (68) which evaluates said generated intermediate images against existing data records in said database (78) in cooperation with said computer (46, 76).

27. The method according to claim 25, characterized in that in said segmentation and data reduction device (66) for generating said intermediate images, comprising the following steps performed in succession:
   a. transmitting an image consisting of a plurality of pixels, said image is converted to a RGB (Red, Green, and Blue) color model;
   b. each of said pixels of said transmitted image based on said RGB color model is converted to an HSV (hue, saturation, value) color model;
   c. each of said pixels based on said HSV (hue, saturation, value) color model is evaluated with respect to color saturation with respect to a threshold value, wherein, if said color saturation value exceeds a said threshold value, said pixels are assigned a binary value "1", and if said color saturation value falls below a said threshold value, said pixels are assigned a binary value "0";
   d. in parallel with said previous step, each pixel is evaluated based on said HSV color model with respect to a hue angle in a predetermined range, wherein, if said hue angle is within said predetermined range, said pixel is assigned said binary value "1", and if said hue angle is outside said range, pixel is assigned said binary value "0";
   e. from said binary hue angle and color saturation information, said first intermediate image is obtained which contains considerably less data than said image generated by a camera (64).

28. The method according to claim 19, characterized in that said segmentation and data reduction device (66) generates pixel fields from the pixels of the intermediate image.

29. The method according to claim 19, characterized in that said segmentation and data reduction device (66) provides the pixels with position coordinates.

30. The method according to claim 19, characterized in that said classifier (68) performs the classification with the aid of an artificial neural network.

31. The method according to claim 30, characterized in that said artificial neural network is a convolutional neural network (CNN).

\* \* \* \* \*